Dec. 12, 1944.                L. H. PERRY                2,365,105
                          LIQUID CONTROL VALVE
                          Filed Nov. 15, 1943
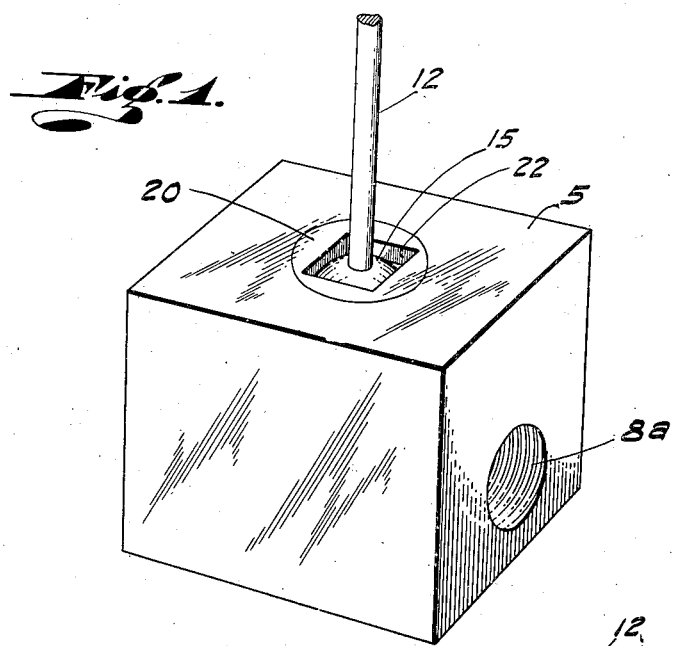
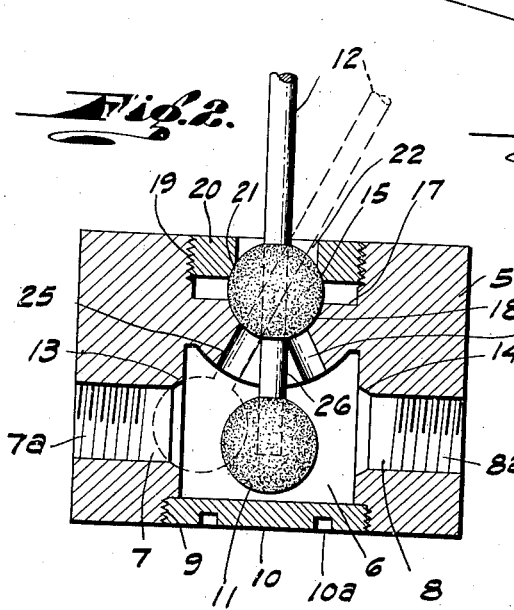
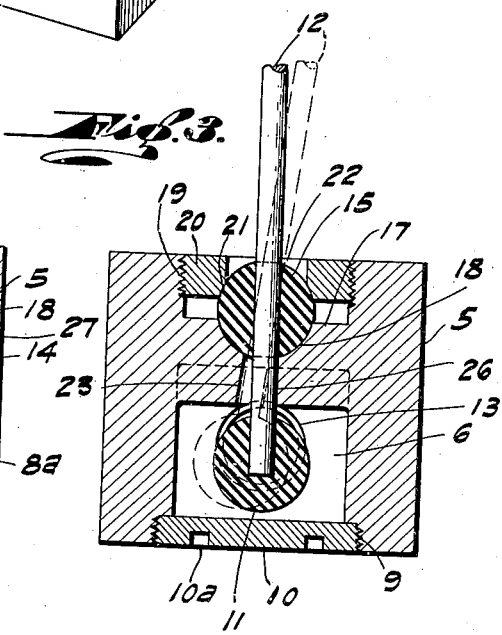
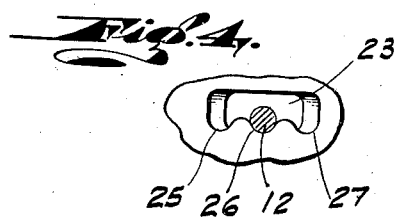
LANDIS H. PERRY,
                    INVENTOR.
BY
                    ATTORNEY Patented Dec. 12, 1944

2,365,105

UNITED STATES PATENT OFFICE 2,365,105

LIQUID CONTROL VALVE

Landis H. Perry, Glendale, Calif.

Application November 15, 1943, Serial No. 510,339

16 Claims. (Cl. 251—13)

This invention relates to a liquid control valve.

The valve provided by this invention is particularly well adapted to control the flow of liquid fuel between two fuel supply tanks or from a fuel supply tank to a motor which derives its energy from the fuel fed to it from said tank.

This valve is particularly well adapted for use upon aircraft and may readily be installed in place of valves of a less satisfactory type now in use in such situations.

Among the objects of the invention are: to reduce operating friction; to provide a valve having an operating arm which can be manipulated with the expenditure of less power and in a quicker, more satisfactory and certain manner; to provide the valve with a plurality of valve seats which can be so used as to divide the wear between them, thereby lengthening the time that the device can be used without being repaired; to provide for manufacture at a lower cost and out of a lighter material, particularly well suited for use upon aircraft; to guard against the operating parts becoming fixed by freezing; and to construct the valve in such a manner that foreign matter mixed with the liquid passing through the valve will not injure the seat portions thereof, even when the device is made of a moldable, non-metallic material.

Another object is to provide a valve structure having a less number of parts and of a more simple kind than would ordinarily be required in a valve capable of operating in an equally advantageous manner.

An important specific object of the invention is to provide an improved operating rod or arm whereby the valve proper is releasably locked either in an open or in a closed position.

Also it is an important object to provide, for a swingable valve operating rod an improved ball seat member, through which the rod passes in a leak-proof manner to the valve chamber and whereby said ball is permitted to have a universal movement and yet a leak-proof seal is provided therearound.

Other objects, advantages and features of invention will hereinafter appear.

Referring to the accompanying drawing, which illustrates what is at present deemed to be a preferred embodiment of the invention, Fig. 1 is a perspective view of the device with the valve operating arm in the intermediate or neutral position, the upper part of said arm being broken away in order to contract the view.

Fig. 2 is a vertical, longitudinal midsection of the device.

Fig. 3 is a transverse midsection thereof.

Fig. 4 is a fragmentary bottom plan view of the upper wall of the valve chamber, the valve operating rod being shown in section in neutral position.

Referring in detail to the drawing, the valve body or casing 5 may be a cube but is shown as a cuboid having a length which is somewhat greater than its transverse dimensions. Said body 5 is preferably molded out of a plastic substance, the mold being shaped to form a valve chamber 6, a passage 7 communicating with one end of said body and a passage 8 with its opposite end, said passages respectively having threaded end portions 7a and 8a into which suitable conduit fittings may be screwed. The valve chamber 6 is preferably rectangular in horizontal section and its lower end has an enlarged circular mouth provided with screw threads 9 to hold in place a circular cap or cover plate 10 having wrench seats 10a.

Within the valve chamber 6 is a globular, preferably elastic, valve 11 which is carried by the lower end of the swingable valve operating rod 12, there being valve seats 13 and 14 for said valve located respectively at the junctures of the passages 7 and 8 with the chamber 6.

In an upwardly spaced relation to the valve 11 the rod 12 passes diametrically through and has fixed to it a bearing ball 15, preferably of hard rubber, a circular recess being formed in the upper side portion of the body 5, said recess having an annular bottom portion 17 extending around the upper side of a concavity 18, said concavity being contoured to engage the bearing ball 15 with a working, leak-proof fit. The recess for the bearing ball 15 has a screwthreaded mouth portion 19 which has screwed into it an annular cap or nut 20, a part of the lower portion of which forms an annular shoulder 21 which is concave or arcuate across its width to conform to the contour of the ball 15 which it engages with a working fit. Said cap 20 has a polygonal central opening 22 to cooperate with a suitable wrench for screwing said cap down upon the ball 15 with sufficient firmness not only to make a leak-proof bearing surface above and below said ball, but at the same time to apply to said ball enough pressure to aid in maintaining it in adjusted positions.

Between the valve chamber 6 and the recess which contains the bearing ball 15, the body 5 is furnished with a generally arcuate passage or chamber 23 the length of which is sufficient to provide for swinging the rod 12 the distance required for its operation. The width of this arcuate passage 23 is such as to provide a working clearance within it for said rod 12. At three places said passage has in one of its sides a preferably concave groove which extends across the entire width of the passage. As seen in Figs. 2 and 4 one of these grooves 25 is located in the left part of the passage 23, another groove 26 is located at the center thereof, and a third groove 27 is located in the right part of said passage. These three grooves are preferably all of the same size and shape, being sufficiently deep to hold the rod 12, when shifted laterally into them, in such adjusted position, to maintain said valve in one or the other of its seated positions, or else in the neutral position indicated in full lines in Figs. 2 and 4, the middle groove 26 being shown also in Fig. 3.

As shown in Figs. 3 and 4 said passage 23, leaving out of consideration the aforesaid grooved portions 25, 26 and 27 thereof, is preferably of substantially the same width throughout its length and has parallel opposite side portions. The aforementioned grooves are each of such size and are also positioned and shaped that when the operating rod 12 is seated in any given groove said rod extends in a vertical plane; hence when said rod is seated in either of the end grooves 25 or 27 it seats truly upon the valve seat 13 or 14 at that end of the valve chamber 6. Also said rod extends vertically when it engages the central groove 26. Accordingly, as shown in dotted lines in Fig. 3, the arcuate passage 23, intermediate its grooved portions, is inclined when viewed in cross section, so that during its swinging movements the rod 12 moves along an inclined plane between the aforesaid seat forming grooves. The width of the ungrooved portion of said passage 23 is somewhat greater than the diameter of the circular rod 12 so as to afford a free, unobstructed swinging movement thereof to bring it opposite to the groove into which, by an additional lateral movement it is shifted into, for example, one or the other of the end grooves to bring the valve 11 into a seated relation to valve seat 13 or 14. In other words, as the curved surface of the rod glides into the arcuate groove (25 or 27) the rod is, during the final part of its swing, deflected laterally as it advances to the extent required to cause the globular valve 11 carried thereby to fit truly upon the valve seat at the instant that said rod completes its swinging movement, whereupon the groove will cooperate with the rod to maintain the valve in its seated position and partly because of the frictional engagement of the nut 20 with the bearing ball 15. The central groove 26, for the same reason, maintains the ball valve in a central, neutral position so that liquid can then flow through the valve chamber in either direction. In addition to the holding function of the nut 20 there is a definite holding of the rod 12 against being swung in the direction of the liquid flow when said rod is in any of the three aforementioned laterally shifted positions. Nevertheless when there is only a slow liquid flow the frictional contact of the bearing ball 15 with its seat and bearing nut will safely hold the ball valve in its shifted positions. Under the latter circumstance the walls of the channel 23 may be parallel and vertical throughout.

The passages 7 and 8, together with their respective valve seats 13 and 14, are positioned with their axes in a vertical plane which passes through the center of the ball bearings member 15, and the grooves 25, 26 and 27 extend radially in relation to the center about which the bearing ball 15 turns.

In assembling the various parts of the device the ball member 15, which has through it a diametrical bore, is first put into place upon the rod 12, being cemented or otherwise secured thereto in a fluid tight manner. Then said bearing ball is placed upon the seat 18 and, while the rod 12 is maintained in an approximately vertical position the annular nut 20 is slipped downwardly therearound and is then screwed into place. While said rod is in the position stated, with its lower end portion projecting downwardly into the valve chamber 6, the ball valve 11, having had a suitable socket formed in it to receive the lower end portion of said rod, is placed over said rod end and is vulcanized thereto, this operation being easily performed owing to the spacious character of said chamber and the free access to be had thereto before the bottom cover member 10 is screwed in place. After said ball valve 11 has been secured to the rod 12 and said cover 10 put in place the valve is ready to have its screwthreaded portions 7a and 8a connected with the conduits with which it is to cooperate. It will be seen that the body member 5 has a considerable bottom surface area around the cover 10 into which screws or other fastenings may extend to attach the device to a support having a flat surface.

Although the operation of the device will be readily understood from the foregoing description, it remains to be noted that the operating arm 12 needs to be swung through an arc of only about fifteen degrees to move the globular valve 11 across the space through which it travels. Also, as soon as one of the valve seats becomes slightly worn the position of the valve body 5 may be reversed so as to cause the other valve seat to function.

This valve, when made of non-metallic material, is more particularly intended for use in situations where only low liquid pressure is encountered; but it may be made of metal and then used where liquid flow supplied under heavy pressure is to be controlled.

It should be understood that the present disclosure is for the purpose of illustration only and that this invention includes all modifications and equivalents which fall within the scope of the subject matter claimed.

What is claimed is:

1. A valve body or casing having a bearing recess in one of its side portions and a valve chamber spaced away from said recess, there being a generally arcuate passage leading from said recess to said chamber, a ball member having a bearing in said recess, a globular valve within said valve chamber, and an operating rod extending through said bearing ball and projecting from each side thereof, one end portion of said rod extending through said arcuate passage and having said globular valve fixed to it, there being a liquid flow passage communicating with each of opposite sides or ends of said valve chamber and provided at its juncture with said chamber with a valve seat for said globular valve, there being a groove extending across one side of each end portion of said arcuate passage into which said rod is laterally shiftable at the limit of its swing in order to seat said rod in an adjusted position wherein it maintains said globular valve truly seated upon the valve seat at that side or end of the casing.

2. The subject matter of claim 1, and there being also a groove leading across the midlength portion of said arcuate passage into which said rod is laterally shiftable to maintain the valve in an intermediate position in relation to said valve seats thus affording an open space through which the liquid may pass into said chamber from one of said liquid flow passages and out therefrom through the other of said liquid flow passages.

3. The subject matter of claim 1, and said bearing recess being circular and having a bottom portion the central part of which is concave to seat said bearing ball, and a nut screwed into said recess, said nut having an internal, annular, arcuate shoulder which retains said bearing ball in its seated position.

4. The subject matter of claim 1, and said valve chamber having a circular mouth portion which opens out at one side of the casing, and a cover plate screwed into said mouth portion.

5. A cuboid valve body having a valve chamber therein provided with a mouth opening at one side of said body and having a plurality of liquid flow passages communicating with said chamber and from other sides of said body, there being a circular recess formed in the side of said body which is opposite the first said side, the bottom portion of said recess extending around the upper side of a concavity with its surrounding walls located in an outwardly spaced relation to said concavity, there being a passage connecting the lower side of said concavity with the upper side of said chamber, a ball having a bearing in said concavity, a globular valve in said valve chamber, an operating rod extending axially through said bearing ball and projecting from each side thereof, one end portion of said rod extending through said passage and being fixed to said globular valve, the other end portion of said operating rod being manually grippable to turn said bearing ball in different directions upon its seat in such a manner as to operate said globular valve to selectively open and close either of said liquid flow passages.

6. The subject matter of claim 5, and a plurality of seats formed in the wall of said passage in which to seat at least a part of that portion of said operating rod which extends between said bearing ball and said globular valve.

7. The subject matter of claim 5, and a plurality of seats formed in the wall of said passage in which to seat at least a part of that portion of said operating rod which extends between said bearing ball and said globular valve, the side wall of said passage between adjacent seats being inclined with respect to the vertical plane of the path through which said valve travels in moving from one to another of its adjusted positions.

8. The subject matter of claim 5, and an apertured cap provided with an annular arcuate bezel screwed into said circular opening, said bezel being contoured to conform to the shape of said bearing ball against which it abuts with a frictional working fit.

9. The subject matter of claim 5 and, said rod being circular, a plurality of seats formed in the wall of said passage in which to seat at least a part of that portion of said circular rod which extends between said bearing ball and said globular valve, and all of said seats being transversely arcuate and extending radially in relation to the center about which said bearing ball turns.

10. The subject matter of claim 5, and a plurality of seats formed in the wall of said passage, said seats cooperating with a portion of said rod which extends between said bearing ball and said globular valve to maintain the latter valve in one of several adjustable positions.

11. A valve body having a valve chamber therein provided with a mouth opening at one side of said body and having a plurality of liquid flow passages communicating with said chamber from other sides of said body, a bearing recess in said body above said valve chamber, a ball member having a bearing in said bearing recess, said bearing recess being circular and having a bottom portion the central part of which is concave to seat said ball member with a working leak-proof fit, there being a passage connecting the lower side of said bearing recess with said valve chamber, an operating rod extending diametrically through said ball member and downwardly therefrom through said passage, a globular valve within said valve chamber carried by the lower end of said rod and thereby adjustable to and from positions wherein it closes said passages, and means carried by said body in a cooperative relation to said rod to maintain the latter in adjusted positions wherein it causes said globular valve to close or open said passages.

12. The subject matter of claim 11 and, a centrally apertured nut screwed into said bearing recess, said nut having an internal, annular, arcuate shoulder surrounding said central aperture which retains said ball member in its seated position.

13. The subject matter of claim 11 and, said means comprising a plurality of seats formed in the wall of said passage.

14. The subject matter of claim 11 and, a cover plate screwed into said mouth.

15. The subject matter of claim 11 and, said globular valve being elastic.

16. A valve body having a valve chamber therein provided with a mouth opening at one side of said body and having a plurality of liquid flow passages communicating with said chamber from other sides of said body, a bearing recess in said body above said valve chamber, a ball member having a bearing in said recess, said bearing recess being circular and having a bottom portion the central part of which is concave to seat said ball member with a working leak-proof fit, there being a passage connecting the lower side of said bearing recess with said valve chamber, an operating rod extending diametrically through said ball member and downwardly therefrom through said passage, a globular valve within said valve chamber carried by the lower end of said rod and thereby adjustable to and from positions wherein it closes said passages, and a centrally apertured nut screwed into said bearing recess, said nut having an internal, annular, arcuate shoulder surrounding said central aperture which retains said ball member in its seated position adjustably.

LANDIS H. PERRY.